(12) United States Patent
Sato (10) Patent No.: US 9,166,517 B2
(45) Date of Patent: Oct. 20, 2015

(54) MOTOR CONTROL DEVICE, BRUSHLESS MOTOR, AND MOTOR CONTROL SYSTEM

(71) Applicant: Panasonic Corporation, Osaka (JP)

(72) Inventor: Daisuke Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/232,319

(22) PCT Filed: Jan. 17, 2013

(86) PCT No.: PCT/JP2013/000179
§ 371 (c)(1),
(2) Date: Jan. 13, 2014

(87) PCT Pub. No.: WO2013/132733
PCT Pub. Date: Sep. 12, 2013

(65) Prior Publication Data
US 2015/0028783 A1    Jan. 29, 2015

(30) Foreign Application Priority Data
Mar. 9, 2012    (JP) .................................. 2012-052652

(51) Int. Cl.
*H02P 1/04*    (2006.01)
*H02P 27/08*    (2006.01)
*H02P 6/06*    (2006.01)
(Continued)

(52) U.S. Cl.
CPC .............. *H02P 27/085* (2013.01); *H02P 6/001* (2013.01); *H02P 6/06* (2013.01); *H02P 2005/4013* (2013.01); *H02P 2207/05* (2013.01)

(58) Field of Classification Search
USPC ................................ 318/400.01, 400.17, 700
See application file for complete search history.

(56) References Cited

U.S. PATENT DOCUMENTS

| | | | | |
|---|---|---|---|---|
| 6,687,555 | B1 * | 2/2004 | Honda et al. ..................... | 700/73 |
| 8,710,783 | B2 * | 4/2014 | Sato .............................. | 318/452 |
| 2004/0174018 | A1 * | 9/2004 | Itoh ............................. | 290/40 C |

(Continued)

FOREIGN PATENT DOCUMENTS

| | | |
|---|---|---|
| CN | 1790892 A | 6/2006 |
| DE | 10352118 | 6/2005 |

(Continued)

OTHER PUBLICATIONS

CN Search Report for 201380002851.3, Aug. 18, 2014.
(Continued)

*Primary Examiner* — Kawing Chan
(74) *Attorney, Agent, or Firm* — RatnerPrestia (57) ABSTRACT

A motor controller comprises a PWM demodulation processor for restoring speed command value Vr from PWM command signal Si, a rotation control section for generating drive value Dd of a motor according to the speed command value Vr, a power drive section for generating driving voltages Uo, Vo and Wo to energize and drive a motor winding according to the drive value Dd, a rotation speed calculating section for generating detected speed value Vd as an information signal to be transmitted to outside, and a PWM modulation processor for generating PWM information signal Fp pulse-width modulated by detected speed value Vd. The PWM modulation processor outputs the PWM information signal Fp generated in synchronization with the PWM command signal.

10 Claims, 4 Drawing Sheets (51) Int. Cl.
*H02P 6/00* (2006.01)
*H02P 5/00* (2006.01)

(56) References Cited

U.S. PATENT DOCUMENTS

| | | | |
|---|---|---|---|
| 2006/0110140 A1* | 5/2006 | Harada | 388/804 |
| 2007/0046229 A1 | 3/2007 | Ogino et al. | |
| 2007/0247092 A1 | 10/2007 | Komatsu et al. | |
| 2008/0112695 A1 | 5/2008 | Kanamori | |
| 2009/0167220 A1 | 7/2009 | Kanamori | |
| 2009/0167376 A1 | 7/2009 | Pellen | |
| 2012/0153882 A1* | 6/2012 | Hong et al. | 318/400.26 |
| 2014/0001999 A1* | 1/2014 | Sato | 318/503 |
| 2014/0084832 A1* | 3/2014 | Sato | 318/452 |
| 2014/0200732 A1* | 7/2014 | Sato | 700/300 |
| 2014/0257574 A1* | 9/2014 | Sato | 700/275 |

FOREIGN PATENT DOCUMENTS

| | | |
|---|---|---|
| JP | 2001-25277 A | 1/2001 |
| JP | 2007-068347 A | 3/2007 |
| JP | 2007-082360 A | 3/2007 |
| JP | 2007-335811 A | 12/2007 |
| JP | 2008-148542 A | 6/2008 |
| JP | 2009-104907 A | 5/2009 |
| JP | 2010-045941 A | 2/2010 |
| JP | 2011-130532 A | 6/2011 |
| JP | 2012-005254 A | 1/2012 |

OTHER PUBLICATIONS

International Search Report for Application No. PCT/JP2013/000179, dated Apr. 23, 2013.

The Extended European Search Report dated Sep. 30, 2014 for the related European Patent Application No. 13757449.7.

* cited by examiner

MOTOR CONTROL DEVICE, BRUSHLESS MOTOR, AND MOTOR CONTROL SYSTEM

THIS APPLICATION IS U.S. NATIONAL PHASE APPLICATION OF PCT INTERNATIONAL APPLICATION PCT/JP2013/00179.

TECHNICAL FIELD

The present invention relates to a motor controller for controlling a rotation speed and the like of a motor according to a command from a host controller, a brushless motor equipped with the motor controller, and a motor control system including a host controller and this brushless motor. In particular, the invention relates to the motor controller for controlling a rotation speed of the motor according to a speed command signal that is pulse-width modulated ("PWM"), the brushless motor, and the motor control system.

BACKGROUND ART

A technique of controlling a fan motor mounted to a vehicle with a host controller such as an electric control unit ("ECU"), for instance, is disclosed in patent literature 1, as one example of hitherto available motor control systems including such motor controllers. The host controller in this literature supplies a rotation speed command of a fan in a form of PWM signal to a brushless motor equipped with a drive control circuit. The drive control circuit thus rotates the fan at a rotation speed corresponding to a duty factor of the PWM signal. Besides, for instance, patent literature 2 discloses a structure in which a motor control unit outputs a rotation detection signal to a host controller in addition to a rotation speed command in a form of PWM signal.

Incidentally, there is growing number of cases in recent years for such motor control systems that are controlled by digital signals using pulse signals. There increases a possibility with such digital processing to cause adverse influence to other apparatuses due to electromagnetic radiation of noises attributable to pulse signals while providing flexibility in the processing. In the case of the above motor control system mounted to a vehicle, for instance, electromagnetic noises are radiated from a main motor body, a power supply, control lines, and the like which give rise to a risk of adverse influence to such devices as a radio mounted to the vehicle.

Certain means have been used to suppress the influence of noises of this kind, such as installing a noise eliminating circuit using capacitors and inductance elements, shielding a source of the noise emission, and providing a structure that enables feeding lines and control lines as short as possible. In addition, patent literature 3 discloses a method of reducing spurious electromagnetic emission in a vehicle by transmitting signals using a cable of twisted-pair structure to cancel out magnetic fields generated by the propagating signals.

In the methods for reducing electromagnetic emission such as those discussed above associated with the noise eliminating circuit, shielding means, and the cables of twisted-pair structure, however, there remain some drawbacks that they increase a number of the circuit components and shielding members for the noise preventive measures, and necessitate special cable materials like the twisted-pair cables. There is also a problem with the structure of shortening the feeding lines and control lines because they impose limitations on the mounting flexibility of the power supply, motor and the like.

CITATION LIST

Patent Literature

PTL 1: Unexamined Japanese Patent Publication No. 2008-148542
PTL 2: Unexamined Japanese Patent Publication No. 2011-130532
PTL 3: Unexamined Japanese Patent Publication No. 2009-104907

SUMMARY OF THE INVENTION

A motor controller of the present invention is a control device configured to receive a PWM command signal formed of a pulse-width modulated rotation speed command, and control a motor to rotate of at a speed corresponding to the rotation speed command. The motor controller comprises a PWM demodulation processor for demodulating the PWM command signal and restoring the rotation speed command as a speed command value, a rotation control section for generating a drive value of the motor according to the speed command value, a power drive section for generating a driving voltage to energize and drive a winding of the motor according to the drive value, an information signal generator for generating an information signal to be transmitted to outside, and a PWM modulation processor for generating a PWM information signal that is pulse-width modulated by the information signal. The PWM modulation processor is configured to generate the PWM information signal synchronized with the PWM command signal and output the same.

A brushless motor of the present invention has a structure comprising a rotor, a stator provided with a three-phase winding, and the motor controller of this invention for energizing and driving the winding.

Furthermore, a motor control system of the present invention comprises the brushless motor of this invention, and a host controller configured to control rotation of the brushless motor by outputting a PWM command signal to the brushless motor and receiving a PWM information signal from the brushless motor.

According to the configurations stated above, magnetic field radiated from a transmission line of the PWM command signal and magnetic field radiated from a transmission line of the PWM information signal become generally opposite to each other in their directions at all the time, since the PWM command signal is synchronized with the PWM information signal, which can equalize pulse periods of both these signals. Unwanted emissions radiated from both transmission lines are thus cancelled out, and spurious emissions can be reduced.

As stated above, the motor controller, the brushless motor and the motor control system of the present invention can reduce the spurious emissions simply by synchronizing the pulse periods of the PWM command signal received at the motor side and the PWM information signal sent out from the motor side. Accordingly, the present invention can provide the motor controller, the brushless motor, and the motor control system with an advantage of reducing the spurious emissions with the simple structures not requiring any special component and material for the noise preventive measures.

DESCRIPTION OF EMBODIMENTS

Description is provided hereinafter of a motor controller, a brushless motor and a motor control system according to exemplary embodiments of the present invention with reference to the accompanying drawings.

Exemplary Embodiment

Figure 1:
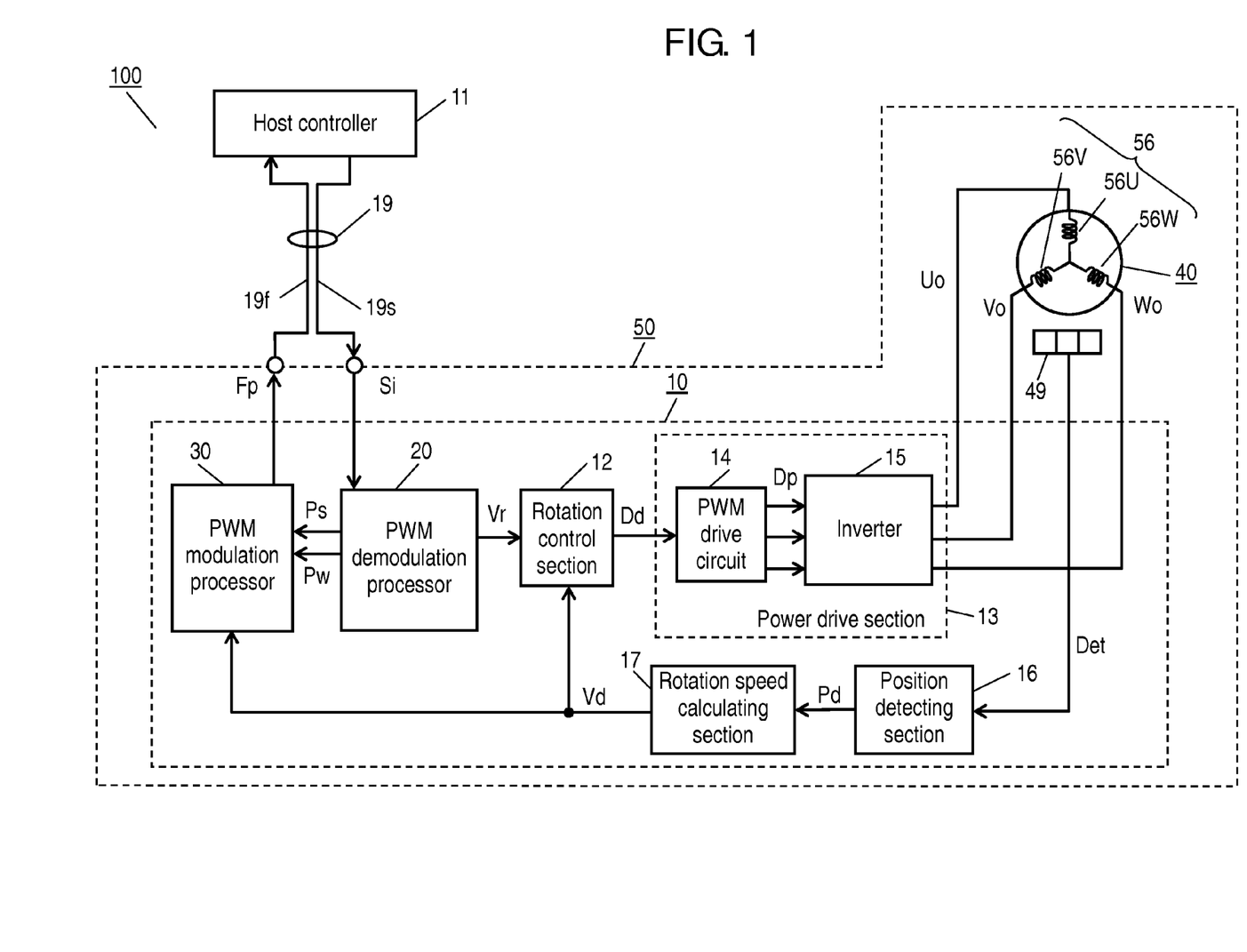
FIG. 1 is a block diagram of a motor control system according to one exemplary embodiment of the present invention.

FIG. 1 is a block diagram of motor control system 100 according to one exemplary embodiment of the present invention. Motor control system 100 described in this embodiment has a structure including brushless motor 50 provided with motor controller 10 of the present invention.

As shown in FIG. 1, motor control system 100 of this embodiment has a structure including brushless motor 50, and host controller 11 used to control brushless motor 50. In this embodiment, brushless motor 50 is so constructed that it includes internally mounted circuit components that constitute motor controller 10, details of which will be described later. In other words, motor controller 10 in brushless motor 50 controls rotation of motor 40, as shown in FIG. 1.

Motor 40 includes a rotor and a stator provided with windings 56, and the rotor rotates when windings 56 are energized. Description given in this embodiment is an example of brushless motor 50 in which motor 40 is driven with a three-phase source having U-phase, V-phase and W-phase that are offset by 120 degrees from one another. Motor 40 has windings 56 to make three-phase operation, which include winding 56U driven in the U-phase, winding 56V driven in the V-phase and winding 56W driven in the W-phase.

Motor controller 10 supplies a drive voltage of a predetermined waveform to each phase of windings 56. As a result, the rotor rotates at a rotation speed according to rotational control of motor controller 10. Motor 40 is additionally provided with a sensor for detecting a rotating position and rotation speed of the rotor in order to carry out such rotational control. In this exemplary embodiment, motor 40 has three position detection sensors 49 such as hall elements disposed to locations corresponding to the individual phases for detecting a rotating position of the rotor. Sensor signal Det is supplied to motor controller 10 from position detection sensors 49.

Motor controller 10 is also in signal communication with host controller 11 through signal transmission lines 19 shown in FIG. 1.

Host controller 11 is located in an apparatus to which brushless motor 50 is mounted, for example, and it is configured of a microcomputer, a digital signal processor ("DSP"), or the like device. In an instance that brushless motor 50 is an electrical component mounted to a vehicle, host controller 11 may be a controller like an ECU. A command for controlling rotation of motor 40 is delivered from such host controller 11 to motor controller 10 through signal transmission lines 19. On the other hand, information of brushless motor 50 is delivered from motor controller 10 to host controller 11 through signal transmission lines 19.

In this exemplary embodiment, a rotation speed command that directs a rotation speed of motor 40 is delivered to motor controller 10 as a command from host controller 11. The rotation speed directed by the rotation speed command is hence delivered through signal transmission line 19s as pulse-width modulated PWM command signal Si.

In addition, predetermined information is delivered from motor controller 10 to host controller 11. Description is provided in this embodiment by taking an example in which the information to be delivered is information of a detected rotation speed. That is, motor controller 10 delivers information indicating the detected rotation speed as an information signal to host controller 11. Here, the detected rotation speed means a rotation speed of motor 40 detected by motor controller 10, and it represents an actual rotation speed. This information signal is pulse-width modulated, and delivered as PWM information signal Fp to host controller 11 through signal transmission line 19f in the same manner as the PWM command signal Si. A numerical figure denoting number of revolutions per minute (rpm) is used, for instance, for the rotation speed command and the detected rotation speed.

A structure of motor controller 10 is described next. Motor controller 10 includes rotation control section 12, PWM drive circuit 14, inverter 15, position detecting section 16, rotation speed calculating section 17, PWM demodulation processor 20, and PWM modulation processor 30. As stated previously, sensor signal Det is supplied to motor controller 10 from each of three position detection sensors 49 disposed to motor 40. In addition, motor controller 10 is connected with host controller 11 via signal transmission lines 19 through which the PWM signal is transmitted.

First, sensor signal Det is supplied from position detection sensors 49 to position detecting section 16. Position detecting section 16 detects position information of the individual phases from the sensor signal Det that varies according to changes in the magnetic polarity with rotation of the rotor. For instance, position detecting section 16 detects timing at which sensor signal Det shows zero-crossing at a point of time when the magnetic polarity changes, and outputs position detection signal Pd based on this detected timing. In other words, a rotating position of the rotor can be detected by using the detected timing since the rotating position corresponds to the detected timing. The position detection signal Pd may be in a form of pulse signal showing such detected timing, as a specific example. Position detecting section 16 supplies position detection signal Pd corresponding to each of the phases to rotation speed calculating section 17.

Rotation speed calculating section 17 calculates a rotation speed of the rotor, for instance by differential operation, based on the rotating position provided by position detection signals Pd. Rotation speed calculating section 17 supplies calculated rotation speeds in the order of time sequence as detected speed values Vd to rotation control section 12 and PWM modulation processor 30. Although what has been described in this exemplary embodiment is one example in which detected speed values Vd are generated based on sensor signal Det from position detection sensors 49, it may instead be a structure configured to detect the rotor speed by using a speed detecting means and generate detected speed values Vd according to a result of this detection. In other words, detected speed values Vd only need to be values or signals in a time series that show speeds actually detected on the rotating motor. In this exemplary embodiment, rotation speed calculating section 17 also functions as an information signal generator for generating an information signal delivered to the outside.

On the other hand, PWM demodulation processor 20 receives PWM command signal Si delivered from host controller 11, and carries out demodulation of this pulse-width modulated signal. By this demodulating operation, PWM demodulation processor 20 restores speed command value Vr in the order of time sequence from the received PWM command signal Si. PWM command signal Si is in a form of pulse signal composed of pulses having pulse-widths corresponding to the rotational speed directed by host controller 11, i.e. the rotation speed command. PWM demodulation processor 20 demodulates PWM command signal Si by detecting pulse-widths, or duty factors corresponding to the pulse-widths, of individual pulses of the PWM command signal Si. PWM demodulation processor 20 then outputs speed command value Vr restored by the demodulation operation in the order of time sequence. The rotation speed command of host controller 11 is thus restored as speed command value Vr by the above operation of PWM demodulation processor 20.

Speed command value Vr is supplied to rotation control section 12.

Rotation control section 12 is also supplied with detected speed value Vd calculated by rotation speed calculating section 17. Rotation control section 12 generates drive value Dd representing a driving quantity for windings 56, based on speed command value Vr and detected speed value Vd. To be specific, rotation control section 12 obtains a deviation in speed between speed command value Vr representing the speed command and detected speed value Vd indicating the detected speed corresponding to the actual speed. Rotation control section 12 then generates drive value Dd representing an amount of torque corresponding to the deviation in the speed, by which to bring the actual speed to conform to the commanded speed. Rotation control section 12 supplies this drive value Dd to PWM drive circuit 14.

PWM drive circuit 14 generates driving waveforms for the individual phases to drive windings 56, pulse-width modulates each of the generated driving waveforms, and outputs them as driving pulse signals Dp. The driving waveforms are sinusoidal waves when windings 56 are driven with sine-wave voltages, or the driving waveforms are rectangular waves when driven with rectangular-pulse voltages. Amplitude of the driving waveforms is determined according to drive value Dd. PWM drive circuit 14 thus makes pulse-width modulation of the driving waveforms generated for each of the phases as modulation signals, and supplies to inverter 15 these driving pulse signals Dp forming pulse train that are pulse-width modulated by the driving waveforms.

Inverter 15 energizes and drives windings 56 by supplying power to windings 56 in the individual phases based on driving pulse signals Dp. Inverter 15 includes a switching element connected to a positive side and another switching element connected to a negative side of the power supply for each of the U-phase, V-phase and W-phase. Driving output Uo of U-phase is connected to winding 56U, driving output Vo of V-phase is connected to winding 56V, and driving output Wo of W-phase is connected to winding 56W. The switching elements are turned on and off in the individual phases by their corresponding driving pulse signals Dp. Drive voltage are thus supplied from the power supply through the turned-on switching elements, and then from the driving outputs to individual windings 56. The supply of these drive voltages causes driving currents to flow through windings 56. Here, individual windings 56 are energized by the driving currents corresponding to the driving waveforms since driving pulse signals Dp are the signals that are pulse-width modulated by the driving waveforms.

PWM drive circuit 14 and inverter 15 make up power drive section 13. As discussed above, power drive section 13 drives motor 40 by energizing windings 56 in the individual phases according to drive value Dd.

With the structure illustrated above, a feedback control loop is formed to control rotation speed of the rotor in a manner to follow speed command value Vr.

In addition, PWM modulation processor 30 is provided in this exemplary embodiment. PWM modulation processor 30 generates PWM information signal Fp by carrying out pulse-width modulation by detected speed value Vd supplied as information signal in the order of time sequence. In order for PWM modulation processor 30 to carry out such pulse-width modulation, PWM demodulation processor 20 supplies to PWM modulation processor 30 with pulse start signal Ps indicating start timing of the individual pulses to be sent out, and pulse-period signal Pw indicating cyclic periods of the individual pulses. PWM modulation processor 30 determines pulse widths of the pulses to be sent out based on detected speed value Vd and pulse-period signal Pw, and sequentially generates pulses that go on only for the periods of these pulse-widths from pulse start signal Ps. The pulse train generated in this manner is sent to host controller 11 through signal transmission line 19f as PWM information signal Fp.

In particular, the structure in this embodiment is so configured that the pulse periods and the phases of PWM information signal Fp are synchronizing with the pulse periods and the phases of PWM command signal Si. In other words, the periods of PWM command signal Si are synchronized with the periods of PWM information signal Fp by using pulse-period signal Pw, and the phase of PWM command signal Si is synchronized with the phase of PWM information signal Fp by the timing of pulse start signal Ps. According to this exemplary embodiment, magnetic field radiated from signal transmission line 19f of PWM information signal Fp becomes generally opposite in the direction to magnetic field radiated from signal transmission line 19s of PWM command signal Si, by virtue of the structure configured above. As a result, unwanted emissions radiated from both signal transmission lines 19 are cancelled out, and the spurious emissions can hence be reduced.

Described next pertains to a detailed structure of PWM demodulation processor 20 and PWM modulation processor 30.

Figure 2:
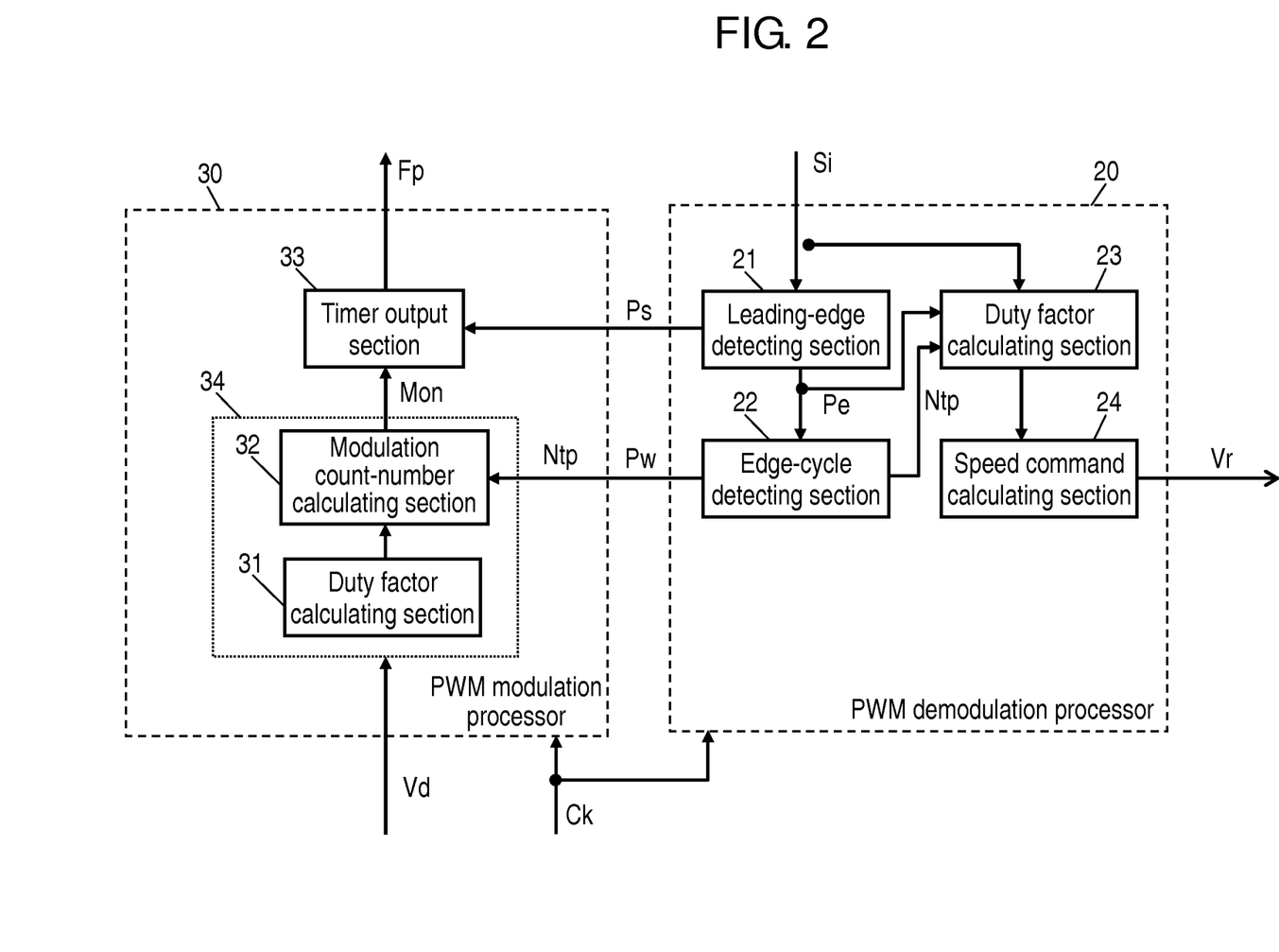
FIG. 2 is a block diagram of a PWM demodulation processor and a PWM modulation processor of a motor controller according to the exemplary embodiment of the present invention.
Figure 3A:
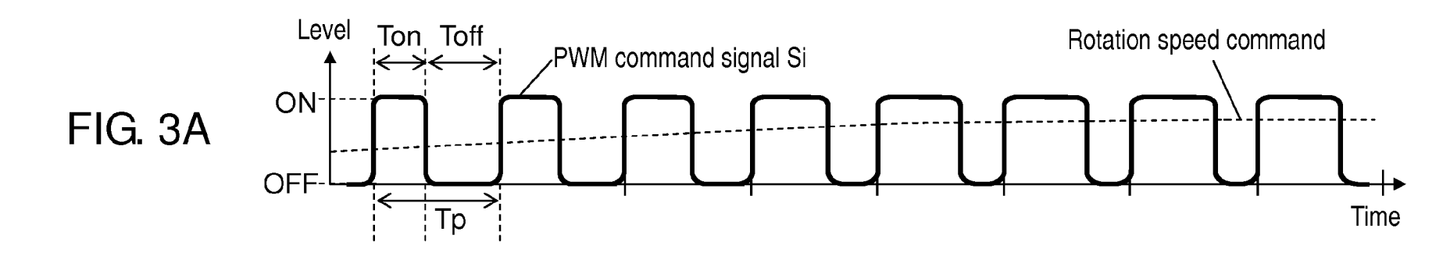
FIG. 3A is a graphic diagram showing a waveform of PWM command signal Si in the motor controller.
Figure 3B:
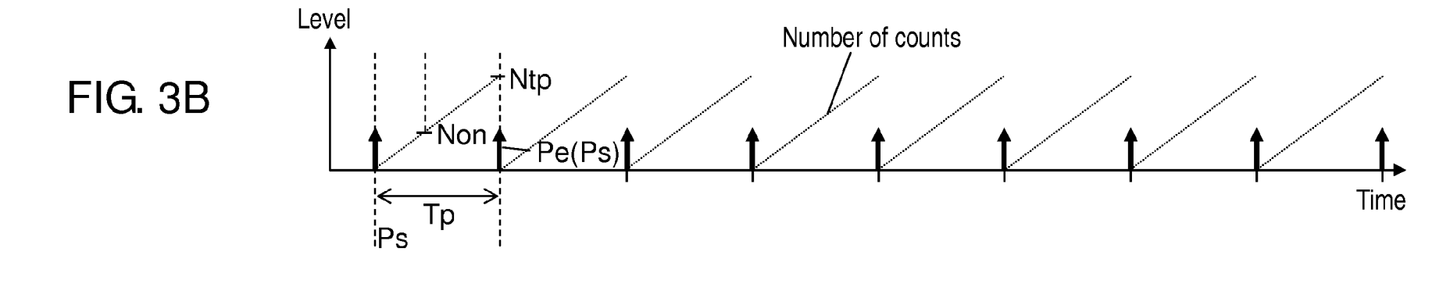
FIG. 3B is a graphic diagram showing timing of pulse start signal Ps in the motor controller.
Figure 3C:
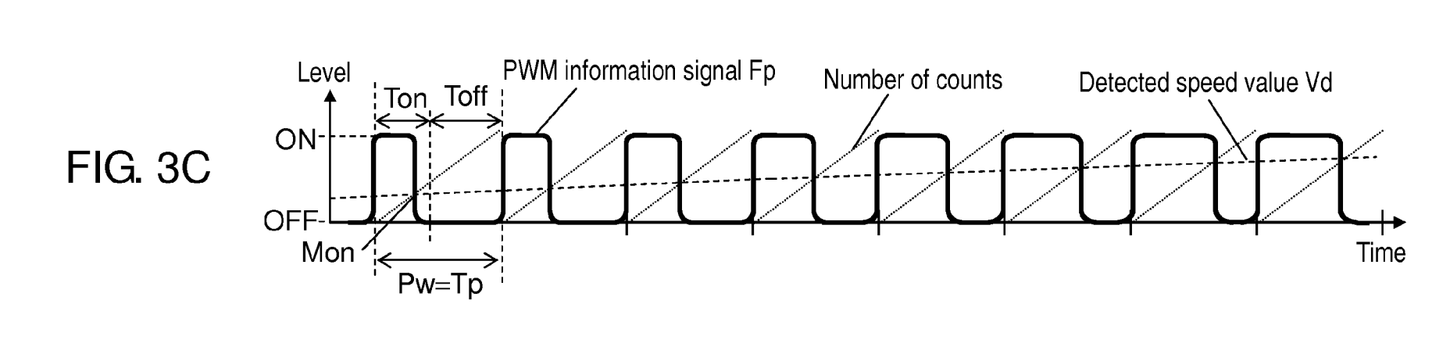
FIG. 3C is a graphic diagram showing a waveform of PWM information signal Fp in the motor controller.

FIG. 2 is a block diagram showing an exemplary structure of PWM demodulation processor 20 and PWM modulation processor 30 of motor controller 10 according to this embodiment of the invention. In addition, FIG. 3A to FIG. 3C are graphic diagrams showing signal waveforms and the like in main points of motor controller 10. FIG. 3A shows a signal waveform of PWM command signal Si in a solid line, FIG. 3B shows timing of pulse start signal Ps in a solid line, and FIG. 3C shows a signal waveform of PWM information signal Fp, also in a solid line.

As shown in FIG. 2, clock signal Ck is supplied to PWM demodulation processor 20 and PWM modulation processor 30. The clock signal Ck is a pulse signal of regular cyclic periods, of which a frequency is substantially higher than frequencies of PWM command signal Si and PWM information signal Fp. For example, both the frequencies of PWM command signal Si and PWM information signal Fp are set at 500 Hz, and the frequency of clock signal Ck is set at 1 MHz. In the example shown in FIG. 2, the structure is so configured that it generates the PWM signal by counting clock signal Ck with a counter.

To begin with, PWM demodulation processor 20 includes leading-edge detecting section 21, edge-cycle detecting section 22, duty factor calculating section 23, and speed command calculating section 24, as shown in FIG. 2.

In PWM demodulation processor 20, PWM command signal Si delivered from host controller 11 is supplied to leading-edge detecting section 21 and duty factor calculating section 23. PWM command signal Si is a pulse train of period Tp, and a time duration of each period Tp is made up of on-period Ton of a high level and off-period Toff of a low level, as shown in FIG. 3A. A pulse width that forms this on-period Ton is modulated by a value of the rotation speed command. In other words, the rotation speed command can be restored by detecting a duty factor, which is a ratio of on-period Ton to the time duration of period Tp. FIG. 3A illustrates an example in which a value of the rotation speed command becomes larger as time passes, and on-period Ton of each pulse, i.e. the duty factor, becomes larger as the rotation speed command speed becomes larger.

Leading-edge detecting section 21 detects timing of a rising edge when each pulse of PWM command signal Si rises from an off state to an on state, and generates edge detection signal Pe based on this timing. The timing of this edge detection signal Pe corresponds to the start timing of each of the pulses that constitute PWM command signal Si, as shown in FIG. 3B. The generated edge detection signal Pe is supplied to edge-cycle detecting section 22 and duty factor calculating section 23. This edge detection signal Pe is also supplied to PWM modulation processor 30 as pulse start signal Ps. Leading-edge detecting section 21 configured to operate in the above manner is provided in this embodiment as one example of an edge timing detector for detecting timing of an edge that changes into a given direction.

Edge-cycle detecting section 22 detects a cyclic period of edge detection signals Pe supplied sequentially from leading-edge detecting section 21. In this exemplary structure, edge-cycle detecting section 22 has a counter for counting a number of clock signals Ck. Edge-cycle detecting section 22 detects the cyclic period of edge detection signals Pe by having the counter count the number of clocks between successive edge detection signals Pe. The counter of edge-cycle detecting section 22 operates in this manner to detect the number of counts Ntp in the interval of period Tp, as shown in FIG. 3B. This detected number of counts Ntp corresponds to period Tp of each of the pulses that constitute PWM command signal Si. The number of counts Ntp is supplied to duty factor calculating section 23, as well as to PWM modulation processor 30 as pulse-period signal Pw.

In this exemplary structure, duty factor calculating section 23 also has a counter for counting the number of clock signals Ck. The counter in duty factor calculating section 23 starts counting at the timing of edge detection signals Pe, continues the counting for duration of on-period Ton of PWM command signal Si, and detects a number of counts Non in the on-period Ton, as shown in FIG. 3B. Furthermore, duty factor calculating section 23 calculates a ratio of the numbers of counts Non to the number of counts Ntp. This ratio corresponds to the duty factor of PWM command signal Si. PWM command signal Si is hence demodulated by calculating this ratio. In addition, speed command calculating section 24 restores the rotation speed command as speed command value Vr from the ratio calculated by duty factor calculating section 23.

Assume that a number of counts Ntp is 2,000 and a number of counts Non is 1,000, for instance, the ratio becomes 0.5 and hence a duty factor of 50%. Speed command calculating section 24 restores a rotation speed command as being 1,000 (rpm) from the duty factor of 50%, for example, or 500 (rpm) if the duty factor is 25%.

Next, PWM modulation processor 30 includes duty factor calculating section 31, modulation count-number calculating section 32 and timer output section 33, as shown in FIG. 2.

Duty factor calculating section 31 calculates a duty factor used to carry out pulse-width modulation from detected speed value Vd supplied to it. For example, duty factor calculating section 31 calculates a duty factor corresponding to a rotation speed indicated by detected speed value Vd, such that the duty factor is 50% when detected speed value Vd is 1,000 (rpm), or the duty factor is 25% when value Vd is 500 (rpm).

Modulation count-number calculating section 32 calculates a pulse width of the on-period of PWM information signal Fp based on a pulse period indicated by pulse-period signal Pw supplied to it and a duty factor provided from duty factor calculating section 31. More specifically, modulation count-number calculating section 32 calculates a number of counts Mon for generating PWM information signal Fp by multiplying a number of counts Ntp indicated by pulse-period signal Pw by the duty factor.

Duty factor calculating section 31 and modulation count-number calculating section 32 constitute pulse-width calculating section 34. That is, pulse-width calculating section 34 calculates the pulse width of the on-period of PWM information signal Fp based on detected speed value Vd and a cyclic period of edges detected by edge-cycle detecting section 22.

Timer output section 33 generates a signal formed of pulse train that becomes on state only for a period corresponding to number of counts Mon from the timing of pulse start signal Ps periodically responding to pulse-period signal Pw, as shown in FIG. 3C. To be specific, timer output section 33 in this exemplary structure has a counter for counting a number of clock signals Ck. The counter in timer output section 33 starts counting at the timing of pulse start signal Ps, and continues the counting up to the number of counts Mon. Timer output section 33 outputs PWM information signal Fp that stays at an on state during a period wherein the counting continues, and switches to an off state from the point when the counting ends. Timer output section 33 also functions as a PWM information signal generator for generating and outputting PWM information signal Fp based on a pulse width calculated by pulse-width calculating section 34 and pulse start signal Ps provided from leading-edge detecting section 21.

PWM demodulation processor 20 and PWM modulation processor 30 in this exemplary embodiment are configured as discussed above. In other words, the timing at which each pulse of PWM information signal Fp rises is based on pulse start signal Ps restored from PWM command signal Si. Accordingly, phases of the individual pulses of PWM information signal Fp are synchronized with phases of the pulses of PWM command signal Si. Moreover, a period of each individual pulse of PWM information signal Fp is based on period Tp restored from PWM command signal Si. Thus, periods of the individual pulses of PWM information signal Fp are also synchronized with periods of the pulses of PWM command signal Si. By virtue of synchronization of PWM information signal Fp with PWM command signal Si, the magnetic field radiated from signal transmission line 19f of PWM information signal Fp becomes generally opposite in direction of the magnetic field radiated from signal transmission line 19s of PWM command signal Si. Unwanted emissions radiated from both signal transmission lines 19 are thus cancelled, thereby achieving a reduction of the spurious emissions.

In this exemplary embodiment, an information signal transmitted with PWM information signal Fp is detected speed value Vd. Here, detected speed value Vd becomes nearly equal to speed command value Vr, when the rotation speed of the rotor controlled according to the rotation speed command of host controller 11 comes to reach a speed directed by this rotation speed command. In other words, a waveform of PWM information signal Fp becomes generally similar to a waveform of PWM command signal Si when the rotation speed reaches the directed speed. Two such signals of similar waveforms are transmitted through both of signal transmission lines 19s and 19f. The magnetic fields radiated from both these signal lines therefore become similar with their direction opposite to each other, thereby cancelling out the unwanted emissions more effectively, and further improving the effect of reducing the spurious emissions.

It is also feasible to employ a structure configured to avoid leading-edge detecting section 21 from outputting pulse start signal Ps during a period when leading-edge detecting section 21 does not detect any edge, and to avoid timer output section 33 from outputting PWM information signal Fp during the same period in conjunction with it. The structure so configured can reduce a frequency of sending PWM information signal Fp needlessly, thereby improving further the effect of reducing the spurious emissions, since PWM information signal Fp is output only when PWM command signal Si is received.

Although what has been described above is an example of structure including PWM demodulation processor 20 and PWM modulation processor 30 made up by using counters and the like devices, it is also possible to form the structure with microcomputers or the like devices. That is, the functions of PWM demodulation processor 20 and PWM modulation processor 30 described above may be replaced with a program that can be installed into the structure to execute the above processes. Moreover, the structure discussed above is one example configured to modulate a pulse width of on-period starting at a rising point of the pulse as a reference. However, the structure can be such that it uses a falling point of the pulse as the reference, or modulates a pulse width of off-period. In essence, the structure only needs to have motor controller 10 that is capable of generating and sending out PWM information signal Fp in synchronization with PWM command signal Si it receives.

Next, description is provided of a detailed structure of brushless motor 50.

Figure 4:
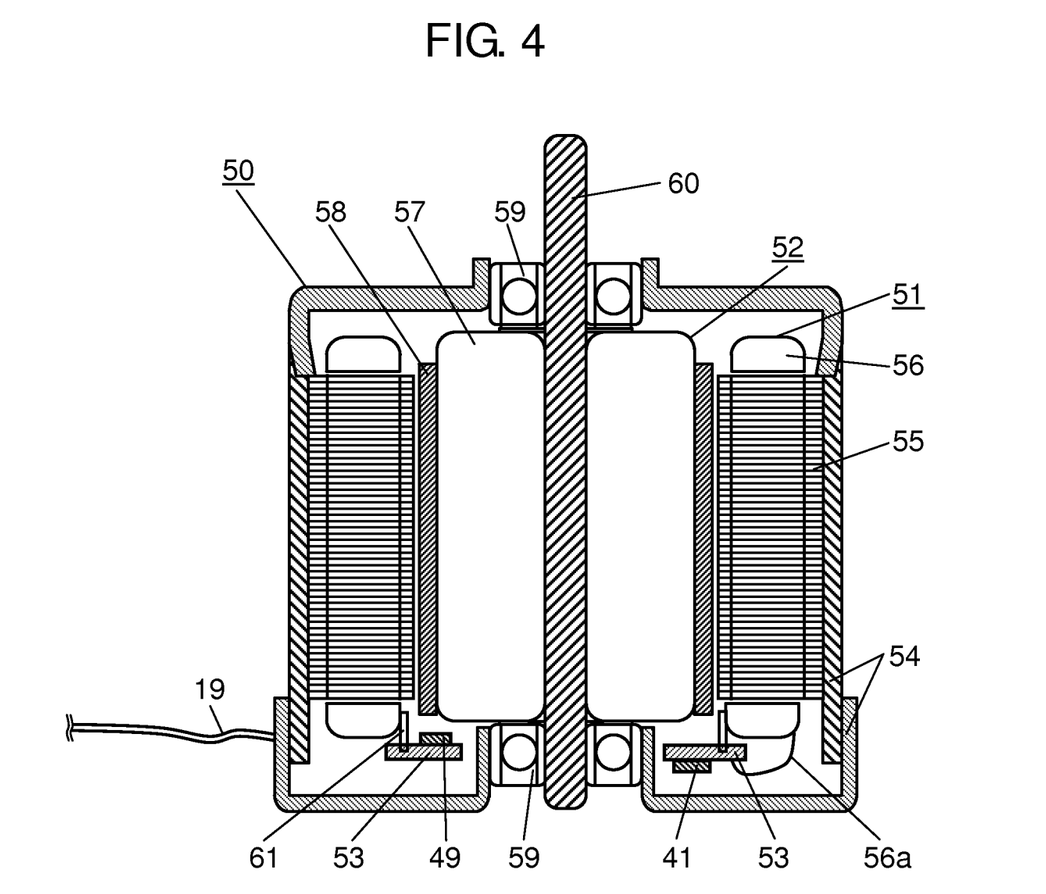
FIG. 4 is a sectional view of a brushless motor according to one exemplary embodiment of the present invention.

FIG. 4 is a sectional view of brushless motor 50 according to one exemplary embodiment of the present invention. In this exemplary embodiment, description is given of an example of inner-rotor type brushless motor 50 having a rotor disposed rotatable to an interior side of a stator.

As shown in FIG. 4, brushless motor 50 includes stator 51, rotor 52, circuit board 53 and motor case 54. Motor case 54 is formed of a metal having a sealed cylindrical shape, and brushless motor 50 has such a structure that stator 51, rotor 52 and circuit board 53 are disposed inside motor case 54.

In FIG. 4, stator 51 is constructed by having windings 56 of individual phases wound around stator core 55. Stator core 55 has a plurality of protruding poles that protrude inward. Stator core 55 has an outer periphery of generally a cylindrical shape, which is fixed to motor case 54. Rotor 52 is inserted in stator 51 with a gap between them. Rotor 52 holds permanent magnet 58 of a cylindrical shape on an outer periphery of rotor frame 57, and is disposed rotatably around rotary shaft 60 supported by bearings 59. In other words, stator 51 and rotor 52 are disposed such that end surfaces of the protruding poles of stator core 55 confront an outer peripheral surface of permanent magnet 58. Motor 40 is thus constructed by having stator 51 of such configuration and rotor 52 supported by bearings 59.

In addition, this brushless motor 50 has circuit board 53 disposed inside motor case 54, with various circuit components 41 mounted on circuit board 53. These circuit components 41 concretely configure motor controller 10 for driving and controlling motor 40. Additionally, position detection sensors 49 like hall elements are mounted to circuit board 53 for detecting a rotating position of rotor 52. Support member 61 is attached to stator core 55, and circuit board 53 is fixed within motor case 54 via this support member 61. End portions of individual windings 56U, 56V and 56W of U-phase, V-phase and W-phase are individually tapped out from stator 51 to serve as lead wires 56a, which are connected individually to circuit board 53.

Signal transmission lines 19 are also extended out of brushless motor 50 for connection with host controller 11.

When a power supply voltage and PWM command signal Si are supplied from the outside to brushless motor 50 constructed as above, a drive current flows to windings 56 from motor controller 10 formed on circuit board 53, which in turn generates magnetic field from stator core 55. The magnetic field from stator core 55 and magnetic field of permanent magnet 58 produce an attractive force and a repulsive force corresponding to polarities of these magnetic fields, and these forces make rotor 52 rotate around rotary shaft 60.

As described above, the motor controller of the present invention includes a PWM demodulation processor for demodulating a PWM command signal and restoring a rotation speed command as a speed command value, a rotation control section for generating a drive value of a motor according to the speed command value, a power drive section for generating a driving voltage to energize and drive a winding of the motor according to the drive value, an information signal generator for generating an information signal to be transmitted to outside, and a PWM modulation processor for generating a PWM information signal that is pulse-width modulated by the information signal. The PWM modulation processor is configured to generate and output the PWM information signal that is synchronized with the PWM command signal.

The brushless motor of the present invention includes a rotor, a stator provided with windings for three-phases and the motor controller of this invention for energizing and driving the winding.

Furthermore, the motor control system of the present invention includes the brushless motor of this invention, and a host controller configured to control rotation of the brushless motor by outputting a PWM command signal to and receiving a PWM information signal from the brushless motor.

According to the configurations described above, magnetic field radiated from the transmission line of the PWM command signal and magnetic field radiated from the transmission line of the PWM information signal become generally opposite to each other in their directions at all the time, because both pulse periods of the PWM command signal and the PWM information signal become equal. Unwanted emissions radiated from both these transmission lines are thus cancelled out, and spurious emissions can be reduced. Thus provided according to the present invention are the motor controller, the brushless motor, and the motor control system capable of reducing the spurious emissions with simple structures not requiring any special component and material for noise preventive measures.

Industrial Applicability

The motor controller, brushless motor and motor control system of the present invention are suitable for motors for an electrical component of which a reduction of spurious emissions is especially needed since they are capable of reducing unwanted emissions, and that they are also useful for motors used in electrical apparatuses.

The invention claimed is:

1. A motor controller configured to receive a PWM command signal formed of a pulse-width modulated rotation speed command, and control a motor to rotate at a speed corresponding to the rotation speed command, the motor controller comprising:
a PWM demodulation processor for demodulating the PWM command signal and restoring the rotation speed command as a speed command value;
a rotation control section for generating a drive value of the motor according to the speed command value;
a power drive section for generating a driving voltage to energize and drive a winding of the motor based on the drive value;
an information signal generator for generating an information signal to be input to a PWM modulation processor; and
the PWM modulation processor for generating a PWM information signal that is pulse-width modulated by the information signal,
wherein the PWM modulation processor generates and outputs the PWM information signal synchronized with the PWM command signal; and
the PWM demodulation processor comprises:
an edge timing detector for detecting timing of edges included in the PWM command signal that change into a given direction; and
an edge-cycle detecting section for detecting a cyclic period of the edges, and
the PWM modulation processor comprises:
a pulse-width calculating section for calculating a pulse width of the PWM information signal based on the information signal and the cyclic period of the edges detected by the edge cycle detecting section; and
a PWM information signal generator for generating and outputting the PWM information signal based on the pulse width calculated by the pulse-width calculating section and the timing detected by the edge timing detector.

2. The motor controller as in claim 1, wherein the information signal is a signal showing an actual speed of rotation detected on the motor.

3. A brushless motor comprising a rotor, a stator provided with a winding for three-phases, and the motor controller of claim 1 for energizing and driving the winding.

4. A motor control system comprising the brushless motor of claim 3, and a host controller configured to control rotation of the brushless motor by supplying the PWM command signal to the brushless motor and receiving the PWM information signal from the brushless motor.

5. A motor controller configured to receive a PWM command signal as a pulse-width modulated rotation speed command, and control a motor to rotate at a speed corresponding to the rotation speed command, the motor controller comprising:
a PWM demodulation processor for demodulating the PWM command signal and providing a speed command value;
a rotation control section for generating a drive value of the motor according to the speed command value;
a power drive section for generating a driving voltage to energize and drive a winding of the motor based on the drive value;
an information signal generator for generating an information signal which is a signal showing a speed detected from an actual rotation speed of the motor and for being input to a PWM modulation processor; and
the PWM modulation processor for generating a PWM information signal that is pulse-width modulated by the information signal,
wherein the PWM modulation processor outputs the PWM information signal synchronized with the PWM command signal, and
a magnetic field produced from the PWM information signal is opposite in direction to a magnetic field produced from the PWM command signal, and the magnetic fields are cancelled to reduce spurious emissions,
the PWM demodulation processor comprises:
an edge timing detector for detecting timing of edges included in the PWM command signal that change into a given direction; and
an edge-cycle detecting section for detecting a cyclic period of the edges, and
the PWM modulation processor comprises:
a pulse-width calculating section for calculating a pulse width of the PWM information signal based on the information signal and the cyclic period of the edges detected by the edge cycle detecting section; and
a PWM information signal generator for generating and outputting the PWM information signal based on the pulse width calculated by the pulse-width calculating section and the timing detected by the edge timing detector.

6. A brushless motor comprising a rotor, a stator provided with a winding for three-phases, and the motor controller of claim 5 for energizing and driving the winding.

7. A motor control system comprising the brushless motor of claim 6, and a host controller configured to control rotation of the brushless motor by supplying the PWM command signal to the brushless motor and receiving the PWM information signal from the brushless motor.

8. A motor controller configured to receive a PWM command signal formed of a pulse-width modulated rotation speed command from a host controller, and control a motor to rotate at a speed corresponding to the rotation speed command, the motor controller comprising:
a PWM demodulation processor for demodulating the PWM command signal and restoring the rotation speed command as a speed command value;
a rotation control section for generating a drive value of the motor according to the speed command value;
a power drive section for generating a driving voltage to energize and drive a winding of the motor based on the drive value;
an information signal generator for generating an information signal to be transmitted to the host controller, the information signal being a signal showing an actual speed of rotation detected on the motor; and
a PWM modulation processor for generating a PWM information signal that is pulse-width modulated by the information signal,
wherein the PWM modulation processor generates and outputs the PWM information signal to the host controller synchronized with the PWM command signal, the PWM demodulation processor comprises:
an edge timing detector for detecting timing of edges included in the PWM command signal that changes into a given direction; and
an edge-cycle detecting section for detecting a cyclic period of the edges, and
the PWM modulation processor comprises:
a pulse-width calculating section for calculating a pulse width of the PWM information signal based on the information signal and the cyclic period of the edges detected by the edge cycle detecting section; and
a PWM information signal generator for generating and outputting the PWM information signal based on the pulse width calculated by the pulse-width calculating section and the timing detected by the edge timing detector.

9. A brushless motor comprising a rotor, a stator provided with a winding for three-phases, and the motor controller of claim 8 for energizing and driving the winding.

10. A motor control system comprising the brushless motor of claim 9, and the host controller configured to control rotation of the brushless motor by supplying the PWM command signal to the brushless motor and receiving the PWM information signal from the brushless motor.

* * * * *